(12) United States Patent
Gutsche et al.

(10) Patent No.: US 8,388,718 B2
(45) Date of Patent: Mar. 5, 2013

(54) FILTER MEDIUM

(75) Inventors: Michael Gutsche, Fulda (DE); Günter Ruoff, Neu-Isenburg (DE)

(73) Assignee: MGF Gutsche GmbH & Co. KG, Fulda (DE)

( * ) Notice: Subject to any disclaimer, the term of this patent is extended or adjusted under 35 U.S.C. 154(b) by 262 days.

(21) Appl. No.: 12/741,630

(22) PCT Filed: Nov. 12, 2008

(86) PCT No.: PCT/EP2008/009513
§ 371 (c)(1),
(2), (4) Date: May 6, 2010

(87) PCT Pub. No.: WO2009/062666
PCT Pub. Date: May 22, 2009

(65) Prior Publication Data
US 2010/0236202 A1 Sep. 23, 2010

(30) Foreign Application Priority Data
Nov. 12, 2007 (DE) .......................... 10 2007 054 199
Mar. 14, 2008 (DE) .......................... 10 2008 014 452

(51) Int. Cl.
*B01D 39/16* (2006.01)
*B01D 46/00* (2006.01)

(52) U.S. Cl. ................. 55/486; 55/524; 55/527; 55/528

(58) Field of Classification Search .............. 55/367, 55/486, 488, 514, 521, 523, 524, 525, 528, 55/DIG. 5, DIG. 43, 527; 95/285, 286; 210/504, 210/505, 509
See application file for complete search history.

(56) References Cited

U.S. PATENT DOCUMENTS

| | | | | |
|---|---|---|---|---|
| 4,156,601 A | * | 5/1979 | Pieciak ........................... | 55/367 |
| 4,181,514 A | * | 1/1980 | Lefkowitz et al. ............... | 55/488 |
| 4,774,001 A | * | 9/1988 | Degen et al. .................. | 210/490 |
| 4,816,328 A | * | 3/1989 | Saville et al. .................. | 442/289 |
| 4,877,433 A | * | 10/1989 | Oshitari ........................ | 55/486 |
| 4,902,423 A | * | 2/1990 | Bacino ..................... | 210/500.36 |
| 4,983,434 A | * | 1/1991 | Sassa ........................... | 428/36.2 |
| 5,019,140 A | * | 5/1991 | Bowser et al. ...................... | 96/6 |
| 5,096,473 A | * | 3/1992 | Sassa et al. ..................... | 95/282 |
| 6,156,681 A | | 12/2000 | Tamaru et al. | |
| 6,409,785 B1 | * | 6/2002 | Smithies et al. ................ | 55/486 |
| 7,591,883 B2 | * | 9/2009 | Kameoka et al. ............... | 95/273 |
| 8,057,566 B1 | * | 11/2011 | Sanders et al. ................. | 55/485 |
| 8,197,569 B2 | * | 6/2012 | Healey et al. .................. | 55/487 |
| 2004/0117958 A1 | | 6/2004 | Turkson | |

FOREIGN PATENT DOCUMENTS

| | | |
|---|---|---|
| CN | 101053718 A | 10/2007 |
| DE | 2909148 A | 9/1979 |
| DE | 2909148 A1 | 9/1979 |
| DE | 3509424 A1 | 9/1986 |
| DE | 9301950 U1 | 4/1993 |

(Continued)

*Primary Examiner* — Duane Smith
*Assistant Examiner* — Minh-Chau Pham
(74) *Attorney, Agent, or Firm* — Novak Druce Connolly Bove + Quigg LLP

(57) ABSTRACT

A filter medium has a woven fabric (1) made from mineral yarns that is in turn covered with polymeric staple fibres (2) by needling. Optionally, a diaphragm (3) made from porous polytetrafluoroethylene is applied at least on one side of the filter medium, in particular on its inflow side.

20 Claims, 1 Drawing Sheet

FOREIGN PATENT DOCUMENTS

| | | |
|---|---|---|
| DE | 69005871 T2 | 5/1994 |
| DE | 29502258 U1 | 5/1995 |
| EP | 0246917 A | 11/1987 |
| EP | 0246917 A2 | 11/1987 |
| EP | 0391660 A2 | 10/1990 |
| EP | 0952243 A1 | 10/1999 |
| EP | 0962243 A | 12/1999 |
| EP | 0962243 A1 | 12/1999 |
| EP | 0964243 A1 | 12/1999 |
| EP | 0964243 A2 | 12/1999 |
| EP | 1116510 A1 | 7/2001 |
| EP | 1862208 A1 | 12/2007 |
| JP | 03-068409 A | 3/1991 |
| JP | 06-039113 A | 5/1994 |
| JP | 11137930 | 5/1999 |
| JP | 11156122 A | 6/1999 |
| JP | 11-333224 A | 12/1999 |
| JP | 2002-204909 A | 7/2002 |
| JP | 2005-052709 A | 3/2005 |
| JP | 2005052709 | 3/2005 |
| JP | 2005232622 A | 9/2005 |
| JP | 2006-305562 A | 11/2006 |
| JP | 2007-031845 A | 2/2007 |
| RU | 2190454 C2 | 10/2002 |

* cited by examiner

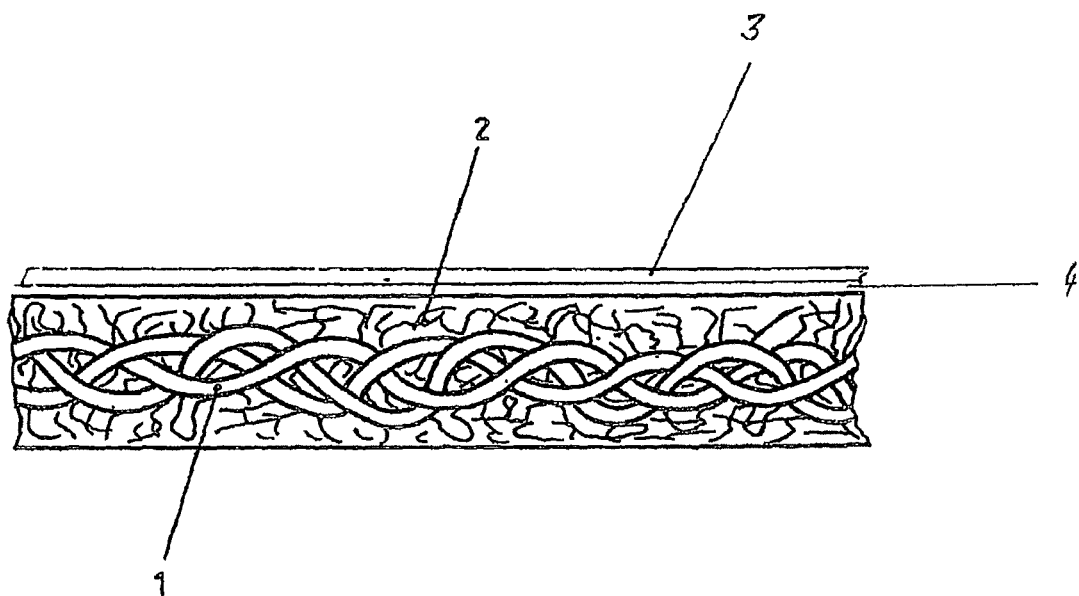

FILTER MEDIUM

CROSS-REFERENCE TO RELATED APPLICATIONS

This application is a national stage application (under 35 U.S.C. §371) of PCT/EP2008/009513, filed Nov. 12, 2008, which claims benefit of German application 10 2007 054 199.8, filed Nov. 12, 2007 and German application 10 2008 014 452.5, filed Mar. 14, 2008.

TECHNICAL FIELD

The invention relates to a filter medium consisting of a woven fabric made of mineral yarns that is covered with polymeric staple fibers by means of needling.

BACKGROUND AND STATE OF THE ART

Such filter media are employed for the filtration of industrial fluid streams, for example, in hot-gas applications such as waste incineration plants, cement kilns and coal furnaces. The filter medium according to the invention can be used, for instance, in so-called bag-filter systems in which the filtering bags made of the filter medium are pulled over support cages. Over the course of time, the textile filter material has to be cleaned and the dust cake that has deposited on the filters has to be removed.

A very efficient cleaning method is the so-called "pulse-jet" method in which pulses of compressed air cause the textile filter material to move, as a result of which the dust cake can be cleaned off the filter. Due to the cleaning procedure, the filter media are subjected to high levels of mechanical stress, which entails the risk that the staple fibers might unravel from the fabric and/or that the fabric might become damaged.

Before this backdrop, European patent application EP 0 962 243 A2 discloses a filter medium of the type mentioned above that is characterized, among other things, by high dimensional stability as well as temperature and chemical resistance. In spite of a sparse covering with staple fibers, crosswise breaks in the fabric after such a pressure step are essentially ruled out since it is practically impossible for unraveling to occur, as a result of which the value does not fall below the requisite minimum number of crosswise staple fibers needed to prevent crosswise breaks.

For purposes of improving the mechanical stability of filter media, European patent application EP 1 391 660 A1 discloses filter laminates that have a membrane made of expanded porous polytetrafluoroethylene, a support fabric likewise made of polytetrafluoroethylene as well as staple fibers—also made of polytetrafluoroethylene—that are needled onto the support fabric. The staple fibers are joined to the membrane by means of a fluorinated polymer that serves as an adhesive.

Finally, European patent application EP 1 862 208 A1 discloses a filter medium having a support fabric containing basalt fibers, whereby at least one side of the support fabric is provided with polymeric staple fibers.

SUMMARY OF THE INVENTION

The invention is based on an objective of improving a filter medium of the above-mentioned type in such a way that it can withstand high levels of mechanical stress without entailing the risk of unraveling or crosswise breaks.

In one embodiment of the invention, a membrane made of porous polytetrafluoroethylene is laminated onto at least one side of the filter medium, especially onto its inflow side.

In this context, it has been surprisingly found that, even if the covering of the filter medium with staple fibers is very sparse, the staple fibers do not become detached from the fabric, so that the fiber composite itself does not become detached. This problem is not encountered with a filter laminate according to European patent application EP 0 391 660 A1 since in that case, right from the start, the staple fibers already have a very high weight per unit area ranging from 678 g/m² to 881 g/m², as a result of which the staple fibers are firmly anchored, thus countering the risk of unraveling.

Moreover, laminating the membrane onto the fabric translates into an additional anchoring of the fiber composite to the fabric. This advantageous effect cannot be achieved as compared to laminate filters having a high percentage by weight of polymeric staple fibers since in that case, the fabric is practically covered by the fibers.

According to an aspect of the invention, the membrane can be made of expanded porous polytetrafluoroethylene having an air permeability of at least 0.01 m³ per m² per hour at a water column pressure of 12.7 mm. Regarding the production of such a membrane, reference is hereby likewise made to European patent application EP 0 391 660 A1, the contents of which are incorporated herein.

In this context, it is particularly advantageous for the membrane to be joined to the filter medium by means of an adhesive. Here, it has been found that the adhesive penetrates into the filter medium to such an extent that this yet again improves the anchoring of the fiber composite to the fabric.

An example of an adhesive that can be used is a fluorinated polymer adhesive of the type indicated in European patent application EP 0 391 660 A1 and also the method for applying the adhesive as described in said document, the contents of which are incorporated herein.

According to an embodiment of the invention, the fabric of the filter medium can contain or be made of glass fibers. In this case, the glass fibers not only fulfill the function of a support fabric but also perform a filtering function due to the density of the fabric they form. The staple fibers serve to prevent crosswise breaks of the filter medium in that the staple fibers prevent buckling due to the curvature radii that are too tight for the glass fibers.

As an alternative or in addition to this, it is also possible according to the invention for the fabric to contain or be made of basalt yarns, for instance, filament yarns.

The basalt yarns provided according to the invention can be continuously drawn basalt yarns that are typically obtained on an industrial scale from a basalt melt. The basalt yarns display a high temperature resistance of up to 600° C. [1112° F.]. Additional methods for the production of basalt fibers or basalt yarns are described, for example, in German patent application DE 29 09 148 A as well as in German patent application DE 35 09 424 A1, the contents of which are incorporated herein.

In comparison to glass fabric, the basalt yarns employed according to the invention display greater thermal stability and greater dimensional stability. When it comes to the physical properties, they have a yarn diameter of less than 10 μm as well as a tex of less than 140. The specific weight ranges from 2.6 kg/dm³ to 2.8 kg/dm³. The mechanical strength of the fabric in the lengthwise direction as well as in the crosswise direction is greater than 1000 N per 5 cm.

The basalt yarns used according to the invention are a natural product that does not biodegrade quickly. The raw material is available in large quantities, which makes the product relatively inexpensive, particularly since it involves a single-component production process. The resistance of basalt yarns to chemical and mechanical influences is high, which means that it lends itself very well for use in filter media.

It is likewise conceivable according to an aspect of the invention for the fabric to have basalt yarns and glass yarns or glass fibers, as a result of which the advantageous properties of basalt yarns can be combined with those of glass yarns.

From the standpoint of production technology, it is particularly favorable if, according to an embodiment of the invention, the fabric consists of interwoven strands of warp and weft threads, for example, in the form of multiple layers, made up of basalt yarns and/or glass fibers. The warp thread strand can consist of a plurality of individual parallel filaments, and so can the weft thread strand. The individual warp and weft threads can lie parallel to each other and form a coherent fabric that is not very thick.

In order to impart sufficient strength to the fabric construction, the warp and weft threads are joined at various weaving and joining points by means of a weaving technique. Furthermore, however, a plain weave or twill weave as well as a leno weave are likewise possible. Various weaving techniques and fabric thicknesses can be employed in order to make the fiber out of basalt yarns and/or glass fibers.

DESCRIPTION OF THE DRAWING

FIG. 1 is a cross-sectional view in side elevation of one exemplary filter medium structure according to the invention.

DETAILED DESCRIPTION OF EMBODIMENTS

Additional objectives, advantages and application possibilities of the present invention ensue from the following description of an embodiment making reference to the drawing. In this context, all of the features described and/or depicted, either on their own or in any meaningful combination, constitute the subject matter of the present invention, also irrespective of their compilation in the claims or in the claims to which they refer back.

The single FIGURE (FIG. 1) shows a filter medium structure according to the invention. The depicted filter medium has a fabric 1 which, in this embodiment, consists of interwoven glass fibers. The percentage by weight of the glass fiber fabric in the total weight of the filter medium ranges, for example, from 70% to 85%. Consequently, the fabric 1 is already capable of performing a filtering function on its own since, because of its thickness, it has sufficient lengthwise strength so that a conventional support fabric is not necessary.

The fabric 1 is covered with a small percentage of staple fibers 2 made of PTFE, as a result of which the filter medium has a thickness of, for instance, 1.5 mm. These needled staple fibers 2 prevent tight curvature radii in the glass fibers that form the fabric 1, thus avoiding crosswise breaks.

The fabric 1 is so tightly woven that it has a weight per unit area of more than 350 g/m$^2$ and a thickness of at least 0.5 mm. The glass fibers have a titer of 0.8 dtex to 8 dtex at the maximum and a cut length of at least 20 mm. The staple fibers 2 may have a titer of 0.5 dtex to 10 dtex, preferably from 0.9 dtex to 7 dtex, and a cut length of at least 20 mm. After the needling step, the filter medium is subjected to a heat treatment at more than 150° C. [302° F.] so that shrinkage of the staple fibers 2 occurs and they can become anchored with respect to each other and in the fabric 1. In addition, after the needling procedure with PTFE staple fibers in a bath, the filter medium can be provided with a coating that gives a rough surface to the PTFE staple fibers.

As an alternative, the fabric 1 can also contain or be made of basalt yarns. It is likewise conceivable for the fabric 1 to consist of basalt yarns and glass yarns or glass fibers.

In case the fabric consists exclusively of basalt yarns, the percentage by weight of the fabric 1 made of basalt yarns in the total weight of the filter medium can range, for example, from 50% to 85%. Consequently, the fabric 1 is already capable of performing a filtering function on its own since, because of its thickness, it has sufficient lengthwise strength so that a conventional support fabric is not necessary.

The basalt yarn fabric 1 can be produced relatively inexpensively, whereby basalt yarns exhibit a high level of resistance to mechanical and chemical influences. In particular, the basalt fabric has a higher melt temperature than glass fabric, which likewise has an advantageous effect on the service life of the filter medium. Moreover, the basalt yarns exhibit an extremely low absorption behavior for water and other liquids.

The fabric 1 in the embodiment selected here is provided with a small percentage of polymeric staple fibers 2 made, for example, of polytetrafluoroethylene (PTFE), as a result of which the filter medium acquires a thickness of, for instance, 1.5 mm. These needled staple fibers 2 prevent tight curvature radii in the basalt yarns that form the fabric 1, thus avoiding crosswise breaks.

The fabric 1 is so tightly woven that it has a weight per unit area of more than 250 g/m$^2$ and a thickness of at least 0.5 mm. Preferably, the fabric 1 has a weight per unit area of 250 g/m$^2$ to 600 g/m$^2$, especially from 400 g/m$^2$ to 500 g/m$^2$ After the needling procedure, the filter medium that contains the basalt fibers is also subjected to a heat treatment at more than 100° C. [212° F.] so that shrinkage of the staple fibers 2 occurs and they can become anchored with respect to each other and in the fabric 1. In addition, after the needling procedure with polymeric staple fibers in a bath, the filter medium can be provided with a coating that gives a rough surface to the PTFE staple fibers.

Preferably, however, in this embodiment of the filter medium as well, a membrane 3 made of expanded porous polytetrafluoroethylene is laminated onto its inflow side, a process in which an adhesive 4 made of fluorinated polymer is employed. Here, it has been shown that the adhesive 4 penetrates into the filter medium to such an extent that an additional improvement of the anchoring of the fiber composite with the fabric 1, combined with a high mechanical flexibility and thermal stressability of the filter, is achieved.

At this juncture, it should be pointed out that, for the sake of clarity, the depiction of the adhesive layer 4 and of the membrane 3 is over-dimensioned with respect to the other dimensions of the filter medium.

While preferred embodiments of the invention have been described and illustrated here, various changes, substitutions and modifications to the described embodiments will become apparent to those of ordinary skill in the art without thereby departing from the scope and spirit of the invention.

LIST OF REFERENCE NUMERALS 1 fabric
2 staple fibers
3 membrane
4 adhesive

The invention claimed is:

1. A filter medium, comprising:
   a fabric (1) made of interwoven mineral yarns, with polymeric staple fibers (2) needled to cover the fabric, said combination forming the filter medium defining an inflow side and an opposite side, and
   a membrane (3) made of porous polytetrafluoroethylene laminated onto at least one side of the filter medium.

2. The filter medium according to claim 1, wherein the membrane (3) is made of expanded porous polytetrafluoroethylene having an air permeability of at least 0.01 $m^3$ per $m^2$ per hour at a water column pressure of 12.7 mm.

3. The filter medium according to claim 1, wherein the membrane (3) is joined to the filter medium with an adhesive (4).

4. The filter medium according to claim 3, wherein the adhesive (4) is a fluorinated polymer.

5. The filter medium according to claim 1, wherein the fabric (1) contains or is made of glass fibers.

6. The filter medium according to claim 1, wherein the fabric (1) contains or is made of basalt yarns.

7. The filter medium according to claim 6, wherein the basalt yarns are selected from the group consisting of fiber yarns, filament yarns, and multifilament yarns.

8. The filter medium according to claim 1, wherein the fabric (1) contains or is made of warp and weft threads that are woven together, with said threads comprising basalt yarns, glass fibers, or combinations of basalt yarns and glass fibers.

9. The filter medium according to claim 1, wherein the fabric (1) has a weight per unit area of from about 250 g/$m^2$ to about 600 g/$m^2$.

10. The filter medium according to claim 1, wherein the fabric (1) comprises several layers or strata.

11. The filter medium according to claim 1, wherein the percentage by weight of polymeric staple fibers (2) in the total weight of the filter medium is less than about 40%.

12. The filter medium according to claim 1, wherein the fabric (1) has a weight per unit area of more than about 250 g/$m^2$ and a thickness of at least about 0.5 mm, and the staple fibers (2) have a titer from about 0.5 dtex to about 10 dtex and a cut length of at least about 20 mm.

13. The filter medium according to claim 1, wherein the staple fibers (2) consist of polytetrafluoroethylene.

14. The filter medium according to claim 1, wherein the surface of the staple fibers (2) is roughened up by a polymeric coating applied after the fibers (2) are needled.

15. The filter medium according to claim 14, wherein the coating consists of a polytetrafluoroethylene containing one or more organic fillers.

16. The filter medium according to claim 15, wherein the organic filler is synthetic silicic acid.

17. The filter medium according to claim 1, shaped in the form of a cloth.

18. The filter medium according to claim 1, shaped in the form of a bag or pouch.

19. A filter medium, comprising:
   a fabric formed of warp and weft threads that are woven together, with said threads comprising basalt yarns, glass fibers, or combinations of basalt yarns and glass fibers;
   polymeric staple fibers covering the fabric, wherein the fabric and polymeric staple fibers together define an inflow side and an opposite side of the filter medium; and
   a porous polytetrafluoroethylene membrane adhesively joined to at least one side of the filter medium.

20. The filter medium of claim 19, wherein the polymeric staple fibers comprise roughened polytetrafluoroethylene fibers, and the polytetrafluoroethylene membrane is an expanded porous polytetrafluoroethylene having an air permeability of at least 0.01 $m^3$ per $m^2$ per hour at a water column pressure of 12.7 mm.

* * * * *

UNITED STATES PATENT AND TRADEMARK OFFICE
CERTIFICATE OF CORRECTION

PATENT NO. : 8,388,718 B2
APPLICATION NO. : 12/741630
DATED : March 5, 2013
INVENTOR(S) : Michael Gutsche and Günter Ruoff Page 1 of 1

It is certified that error appears in the above-identified patent and that said Letters Patent is hereby corrected as shown below:

In the Claims:

Column 6, Claim 16 should read:

--16. The filter medium according to claim [[15]] 1, wherein the coating consists of a polytetrafloroethylene containing an inorganic filler and the inorganic the organic filler is synthetic silicic acid.--

Signed and Sealed this
Thirtieth Day of April, 2013

Teresa Stanek Rea
*Acting Director of the United States Patent and Trademark Office*